(12) United States Patent
Markley et al.

(10) Patent No.: US 12,462,053 B1
(45) Date of Patent: Nov. 4, 2025

(54) TECHNIQUES FOR SELECTIVE ENDPOINT DATA MONITORING

(71) Applicant: Amazon Technologies, Inc., Seattle, WA (US)

(72) Inventors: Dexter W. Markley, Oakhurst, CA (US); Philip Clark Shuman, Santa Maria, CA (US); Dejan Milinko Dordevic, San Luis Obispo, CA (US); Jennifer Helen Maunder, San Luis Obispo, CA (US); Carter Lucas Van Deuren, San Luis Obispo, CA (US); Timothy Robert Bojorquez, Templeton, CA (US); Zdenek Daniel Dohnalek, Bellevue, WA (US); Oliver Curry, Santa Margarita, CA (US); David Alan Hawkins, Camas, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 18/065,377

(22) Filed: Dec. 13, 2022

(51) Int. Cl.
*G06F 21/62* (2013.01)

(52) U.S. Cl.
CPC .............................. *G06F 21/6209* (2013.01)

(58) Field of Classification Search
CPC ........ G06F 21/31; G06F 21/62; G06F 21/604; G06F 21/6209; G06F 21/6227; G06F 16/164; H04L 63/0807; H04L 63/1416; H04L 63/1466; H04L 63/1491; H04L 12/4641; H04L 67/06; H04L 67/1097

USPC .......................................................... 726/26
See application file for complete search history.

(56) References Cited

U.S. PATENT DOCUMENTS

| | | | |
|---|---|---|---|
| 7,734,600 B1* | 6/2010 | Wise ................... | G06F 21/6218 707/661 |
| 11,711,396 B1* | 7/2023 | Agrawal ............. | H04L 63/1441 |
| 11,757,933 B1* | 9/2023 | Agrawal ............. | H04L 63/1466 726/23 |
| 2012/0281706 A1* | 11/2012 | Agarwal ............. | H04L 12/4633 370/395.53 |
| 2013/0080785 A1* | 3/2013 | Ruhlen ................... | H04L 67/51 713/176 |
| 2015/0006475 A1* | 1/2015 | Guo ..................... | G06F 16/1752 707/693 |
| 2015/0341383 A1* | 11/2015 | Reddy ................. | H04L 63/0876 726/22 |
| 2017/0339178 A1* | 11/2017 | Mahaffey ............ | G06F 11/3006 |

(Continued)

*Primary Examiner* — James N Fiorillo
(74) *Attorney, Agent, or Firm* — Eversheds Sutherland (US) LLP

(57) ABSTRACT

Systems, devices, and methods are provided for selective endpoint data monitoring. A system may determine, at an endpoint client running in a privileged mode of operation, a first request by a first application to access a first network destination. The system may further determine, at the endpoint client, that network traffic to the first network destination should be monitored. The system may further determine, at the endpoint client, that a data security extension has been provisioned on the first application. The system may provide, to the first application, information usable to access the first network destination. The system may obtain, from the data security extension, metadata associated with data that the first application provides to the first network destination.

15 Claims, 7 Drawing Sheets

(56) References Cited

U.S. PATENT DOCUMENTS

| | | | | |
|---|---|---|---|---|
| 2017/0346853 | A1* | 11/2017 | Wyatt | H04L 43/12 |
| 2018/0295134 | A1* | 10/2018 | Gupta | H04L 67/56 |
| 2019/0124112 | A1* | 4/2019 | Thomas | G06F 21/40 |
| 2021/0136569 | A1* | 5/2021 | Obaidi | H04W 12/37 |
| 2021/0182397 | A1* | 6/2021 | Karnik | H04W 12/122 |
| 2021/0218755 | A1* | 7/2021 | Swanson | H04L 63/101 |
| 2021/0392111 | A1* | 12/2021 | Sole | H04L 63/1416 |
| 2022/0147508 | A1* | 5/2022 | Herndon | G06F 21/6209 |
| 2022/0207170 | A1* | 6/2022 | Poothokaran | G06F 21/6227 |
| 2023/0076201 | A1* | 3/2023 | Bebchuk | H04L 63/1416 |
| 2023/0123781 | A1* | 4/2023 | Kaimal | H04L 9/3247 |
| | | | | 726/12 |
| 2023/0367833 | A1* | 11/2023 | Kol | G06F 16/958 |

* cited by examiner

US 12,462,053 B1

TECHNIQUES FOR SELECTIVE ENDPOINT DATA MONITORING

BACKGROUND

There are many challenges involved in data security and data privacy. Many individuals, organizations, and other entities use electronic systems to store sensitive data. While monitoring and protecting important data from being improperly disseminated is important, there are also data privacy concerns surrounding how electronic systems are monitored. While an organization may desire to monitor all activities that occur on its devices, there is also a need to protect the privacy of the device's users. For example, an organization may be concerned with monitoring how corporate documents and know-how are being distributed within and outside of a corporate network to determine whether sensitive data is being improperly exfiltrated but on the other hand, the organization is typically not interested in monitoring the movement of other types of data, such as personal files of its employees. Accordingly, there are many challenges involved in the competing needs for both data privacy and data security.

Figure 1:
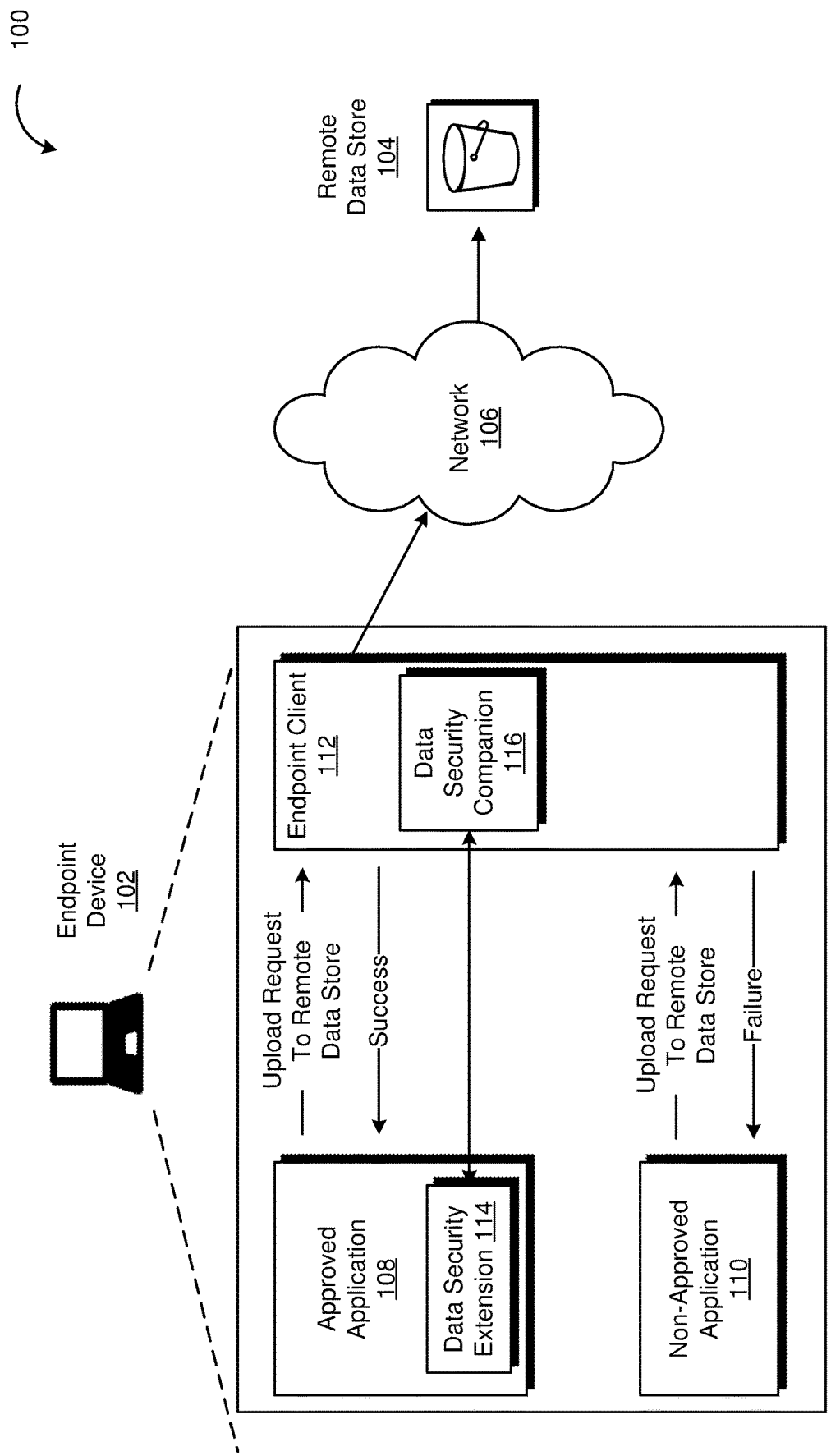
FIG. 1 illustrates a computing environment 100 in which selective endpoint data monitoring techniques may be applied, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for selective data monitoring.

In many organizations, laptops are a typical example of an endpoint device that can be used to connect to an organization's internal networks from off-premises endpoints. With the proliferation of remote work, data security of off-premises endpoints is becoming of greater and greater importance to organizations. However, naive strategies for implementing data security on endpoints may result in solutions that are intrusive and result in poor computational performance. For example, a system that monitors and records all data traffic to and from an endpoint provides for little or no data privacy to endpoint users. Furthermore, an organization that collects and records all data traffic may inadvertently collect user data that is not of importance to the organization, but whose storage and retention is subject to government regulations. For example, if an endpoint user uploads or emails him or herself a copy of their own health records and such information is recorded by the organization as a data security effort, the organization's storage, retention, and destruction of such data may be considered protected health information (PHI) subject to government regulations such as the Health Insurance Portability and Accountability Act (HIPAA). Implementing systems and procedures to ensure compliance with a myriad of government and corporate regulations around various types of data may be onerous and difficult to implement, test, and maintain.

Techniques described herein allow for selective data monitoring of endpoint devices. These techniques allow organizations to collect and store significantly less information than is typical for endpoint monitoring, and to specifically focus data monitoring efforts on network traffic that is most likely to be relevant to an organization's effort to protect the organization's sensitive data. Endpoint devices may be implemented using techniques described in connection with techniques described throughout this disclosure, for example, as discussed in connection with FIGS. 1-4.

In various embodiments, endpoint devices may have various components installed or otherwise provisioned within the context of its execution environment, including but not limited to approved application, non-approved application, and an endpoint client.

Applications may refer to an executable program or other types of software that may be used to submit data transmission requests such as file uploads. When an application-such as approved application or non-approved application attempts to transmit data over a network, one or more aspects of the request may be processed by an endpoint client. An endpoint client may refer to a privileged component running on an endpoint device, such as a kernel mode component or system extension, such as Extended Berkeley Packet Filter (eBPF) or other kernel technologies, that is used to perform selective data monitoring on the endpoint device. In various embodiments, an endpoint device is issued by an organization such as a corporation and such devices may be provisioned with an endpoint client that selectively monitors network traffic and ensures that the organization's sensitive data is not improperly exfiltrated from the endpoint device.

In various embodiments, an endpoint client performs various functionality on endpoint devices, such as domain name system (DNS) filtering. For example, if a user wants to go to an inappropriate site, endpoint client checks a list of domains and determines that the domain should be blocked. In various embodiments, endpoint client also provides application blocking capabilities to prevent malicious or unauthorized applications from running on the endpoint device. In various embodiments, endpoint client is used for capturing network telemetry and metadata about transactions that are happening, bytes being sent to various Internet Protocol (IP) addresses, and so on and so forth. In various embodiments, endpoint client is configured by an organization on its corporate assets that are used by employees to access a private corporate network.

An endpoint client may determine whether and/or how to process data transmission requests, at least in part. In at least one embodiment, endpoint client comprises or otherwise has access to a monitor list that includes network destinations to monitor. The monitor list may be provisioned by system administrators or data security specialists of an organization that provisions endpoint device.

The endpoint client may be used to determine various properties of the process that is making a data upload request. For example, the endpoint client may be able to determine, for a data upload request, the data contents, the process of making the call, a destination (e.g., in the form of a Uniform Resource Locator (URL)), and more. As part of processing the request, the destination information may involve a DNS resolution wherein a hostname is mapped to an IP address. Endpoint client may cause the DNS resolution to fail for non-approved application when attempting to access certain network destinations as defined in the monitor list. For the sake of example, the remote data store may be determined by an organization to be of interest, and hostnames and/or URLs associated with the remote data store may be included in a monitor list endpoint client uses for selective data monitoring. The endpoint may furthermore have a list of approved applications. Non-approved application may refer to an application that is not included in the list of approved applications. Based on this information, endpoint client may determine that data upload requests made by non-approved application to send data to remote data store should not be permitted. One way in which endpoint clients may restrict such behavior is through a failed DNS resolution.

In various embodiments, attempting an upload data request from non-approved application to upload a file or other data to remote data store results in a failure and a graphical interface such as a popup or error message may be presented to the user of endpoint device, stating that the user is attempting to use a non-approved path for interacting with remote data store. If an approved path exists on the device, the user may be provided with additional information recommending that the user use an approved path to access the remote data store.

Conversely, upload requests to remote data store may be permitted in other circumstances. For example, a list of approved applications may include approved application. When endpoint client determines that the process making a data upload request to a monitored destination is in the approved applications list, the endpoint client may perform a further check to ensure that the approved application is configured with data security extension. In some cases, there may be instances of applications that are allowed to contact a given domain as an exception that does not require the monitoring extension. In various embodiments, approved application is a type of web browser application and data security extension is a web browser extension that is configured to communicate with data security companion running in the context of an endpoint client.

The data security extension may be used to parse outgoing data transmission requests by approved applications. For example, when an approved application is launched, it may load a data security extension and may establish a connection with the data security companion running in the endpoint client. The data security extension may be used to monitor network calls and collect information regarding data transmission requests. For example, when an approved application attempts to perform a data upload to a remote data store, the data security extension may collect information regarding the data transfer.

In various embodiments, responsive to a file being uploaded, metadata regarding the file may be recorded, such as the filename, file size, checksums, hashes thereof, and so on and so forth. In various embodiments, a MinHash is generated for a file or portions thereof and provided by the data security extension to the data security companion. As a specific example, for text files, a MinHash may be generated for every paragraph of a file. Metadata collected regarding data transfers-such as filenames, file sizes, checksums, MinHashes, etc. may be stored locally in a log file and/or uploaded to an organization's servers. Metadata may be aggregated for multiple users at an organization's server, and may serve as a central point at which auditors may perform further investigation regarding whether certain data has been exfiltrated and/or whether certain endpoint devices may be involved in exfiltration of sensitive data.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 in which selective endpoint data monitoring techniques may be applied, in accordance with one or more example embodiments of the present disclosure.

In various embodiments, computing environment 100 comprises an endpoint device 102, a remote data store 104, and a network 106 over which the endpoint device 102 may be capable of communicating with remote data store 104. It is noted that endpoint device 102 may block access to remote data store 104 using techniques described herein, and that network connections between endpoint device 102 and other computing entities connected via network 106 may be blocked, for example, in cases where the remote data store 104 is included in a deny-list.

Endpoint device 102 may refer to a computing device such as a personal computer (PC), laptop, or other suitable endpoint devices. An endpoint may refer to a remote computing device that communicates back and forth with a network which it is connected to. In many organizations, laptops are a typical example of an endpoint device that can be used to connect to an organization's internal networks from off-premises endpoints. With the proliferation of remote work, data security of off-premises endpoints is becoming of greater and greater importance to organizations. However, naive strategies for implementing data security on endpoints may result in solutions that are intrusive and result in poor computational performance. For example, a system that monitors and records all data traffic to and from an endpoint provides for little or no data privacy to endpoint users. Furthermore, an organization that collects and records all data traffic may inadvertently collect user data that is not of importance to the organization, but whose storage and retention is subject to government regulations. For example, if an endpoint user uploads or emails him or herself a copy of their own health records and such information is recorded by the organization as a data security effort, the organization's storage, retention, and destruction of such data may be considered protected health information (PHI) subject to government regulations such as the Health Insurance Portability and Accountability Act (HIPAA).

Implementing systems and procedures to ensure compliance with a myriad of government and corporate regulations around various types of data may be onerous and difficult to implement, test, and maintain.

In various embodiments, endpoint device 102 is a device that is owned or otherwise provided by an organization. In some cases, an organization may have a bring-your-own-device (BYOD) policy where employees or other entities can bring their own devices to the corporate environment and grant the organization operating control of the device and control the security posture of the device to ensure the device is able to securely access the corporate environment. The endpoint device 102 may be used to access a corporation's private network and corporate services to access sensitive data that should not be otherwise exported from the endpoint device 102 outside of the corporate environment.

Techniques described herein allow for selective data monitoring of endpoint devices. These techniques allow organizations to collect and store significantly less information than is typical for endpoint monitoring, and to specifically focus data monitoring efforts on network traffic that is most likely to be relevant to an organization's effort to protect the organization's sensitive data. Endpoint device may be implemented using techniques described in connection with techniques described throughout this disclosure, for example, as discussed in connection with FIG. 2.

Remote data store 104 may refer to a data store or storage service that may be accessed via network 106. The remote data store may be controlled by a third-party entity different from the entity that controls the security posture of the endpoint device. In various embodiments, remote data store may refer to a file sharing service that is generally accessible via network 106. Remote data store 104 may have a frontend service that implements various application programming interfaces (APIs) that may be used for uploading data to the remote data store 104. For example, remote data store 104 may typically be accessed by a user via a website, executable, mobile application etc. and the user may choose to upload, replicate, or synchronize data files with the remote data store. One avenue by which data may be exfiltrated from a corporate network environment is through file sharing services outside of a corporate network.

Endpoint device 102 may communicate with remote data store 104 via network 106 (and vice versa) using a transmission medium via the network interface device/transceiver utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver may include one or more physical jacks (e.g., Ethernet, coaxial, or phone jacks) or one or more antennas to connect to the network 106. In an example, the network interface device/transceiver may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the computing entities (e.g., endpoint device 102) and includes digital or analog communications signals or other intangible media to facilitate communication of such software. Communications techniques described in connection with FIG. 7 may be implemented in the context of FIG. 1 to facilitate communications between endpoint device 102 and a server that hosts remote data store 104.

In various embodiments, endpoint device 102 may comprise various components, such as hardware and/or software. For example, endpoint device 102 may have various components installed or otherwise provisioned within the context of its execution environment, including but not limited to approved application 108, non-approved application 110, and endpoint client 112.

Applications may refer to an executable program or other types of software that may be used to submit data transmission requests such as file uploads. When an application-such as approved application 108 or non-approved application 110 attempts to transmit data over a network, one or more aspects of the request may be processed by endpoint client 112. Endpoint client 112 may refer to a privileged component running on endpoint device 102, such as a kernel mode component or system extension. Extended Berkeley Packet Filter (eBPF) is an example of a kernel technology that may be used to implement endpoint client 112 on various devices, according to one or more embodiments of the present disclosure.

Endpoint client 112 may refer to a privileged component running on endpoint device 102, such as a kernel mode component or system extension and may be used to perform selective data monitoring on the endpoint device 102. In various embodiments, endpoint device 102 is a device that is issued by an organization such as a corporation and such devices may be provisioned with endpoint client 112 to selectively monitor network traffic and ensure that the organization's sensitive data is not improperly exfiltrated from the endpoint device 102.

In various embodiments, endpoint client 112 performs various functionality on endpoint device 102, such as DNS filtering. For example, if a user wants to go to an inappropriate site, endpoint client 112 checks a list of domains and determines that the domain should be blocked. In various embodiments, endpoint client 112 also provides application blocking capabilities to prevent malicious or unauthorized applications from running on the endpoint device. In various embodiments, endpoint client 112 is used for capturing network telemetry and metadata about transactions that are happening, bytes being sent to various IP addresses, and so on and so forth. In various embodiments, endpoint client 112 is configured by an organization on its corporate assets that are used by employees to access a private corporate network.

Endpoint client 112 may determine whether and/or how to process data transmission requests, at least in part. In at least one embodiment, endpoint client 112 comprises or otherwise has access to a monitor list that includes network destinations to monitor. The monitor list may be provisioned by system administrators or data security specialists of an organization that provisions endpoint device 102.

In at least one embodiment, endpoint client 112 is able to determine various properties of the process that is making a data upload request. For example, endpoint client 112 may be able to determine, for a data upload request, the data contents, the process making the call, a destination (e.g., in the form of a URL), and more. As part of processing the request, the destination information may involve a DNS resolution wherein a hostname (e.g., www.website.com) is mapped to an IP address. Endpoint client 112 may cause the DNS resolution to fail for non-approved application 110 when attempting to access certain network destinations as defined in the monitor list. For the sake of example, the remote data store 104 may be determined by an organization to be of interest, and hostnames and/or URLs associated with the remote data store 104 may be included in a monitor list endpoint client 112 uses for selective data monitoring. Endpoint client 112 may furthermore have a list of approved applications. Non-approved application 110 may refer to an application that is not included in the list of approved applications. Based on this information, endpoint client 112 may determine that data upload requests made by non-approved application to send data to remote data store 104 should not be permitted. One way in which endpoint client 112 may restrict such behavior is through a failed DNS resolution.

In various embodiments, attempting an upload data request from a non-approved application to a remote data store results in a failure and a graphical interface such as a popup or error message may be presented to the user of the endpoint device, stating that the user is attempting to use a non-approved path for interacting with remote data store. If an approved path exists on the device, the user may be provided with additional information recommending that the user use an approved path to access the remote data store. For example, the user of the endpoint device may receive an error when attempting to upload a file to remote data store 104 via non-approved application 110, and may be prompted to use approved application 108 instead to perform the same task.

Conversely, upload requests to remote data store 104 may be permitted in other circumstances. For example, a list of approved applications may include approved application 108. When endpoint client 112 determines that the process making a data upload request to a monitored destination is in the approved applications list, the endpoint client 112 may perform a further check to ensure that the approved application is configured with data security extension 114. In various embodiments, approved application 108 is a type of web browser application and data security extension 114 is a web browser extension that is configured to communicate with data security companion 116 running in the context of endpoint client 112. Web browser applications should be understood to describe an illustrative, non-limiting example of an approved application and approved application 108 could refer to other types of applications that are configured to perform selective endpoint monitoring with a data security extension.

Data security extension 114 may be used to parse outgoing data transmission requests by approved application 108. For example, when approved application 108 is launched, it may load data security extension 114 and may establish a connection with data security companion 116. Data security extension 114 may monitor network calls by approved application 108 and may collect information regarding data transmission requests being made by approved application. For example, when approved application 108 attempts to perform a data upload to remote data store 104, data security extension may collect information regarding the data transfer.

In various embodiments, responsive to a file being uploaded, metadata regarding the file may be recorded, such as the filename, file size, checksums, hashes thereof, and so on and so forth. In various embodiments, a MinHash is generated for a file or portions thereof and provided by data security extension 114 to data security companion 116. As a specific example, for text files, a MinHash may be generated for every paragraph of a file. Metadata collected regarding data transfers-such as filenames, file sizes, checksums, MinHashes, etc. may be stored locally in a log file and/or uploaded to an organization's servers. Metadata may be aggregated for multiple users at an organization's server, and may serve as a central point at which auditors may perform further investigation regarding whether certain data has been exfiltrated and/or whether certain endpoint devices may be involved in exfiltration of sensitive data.

Figure 2:
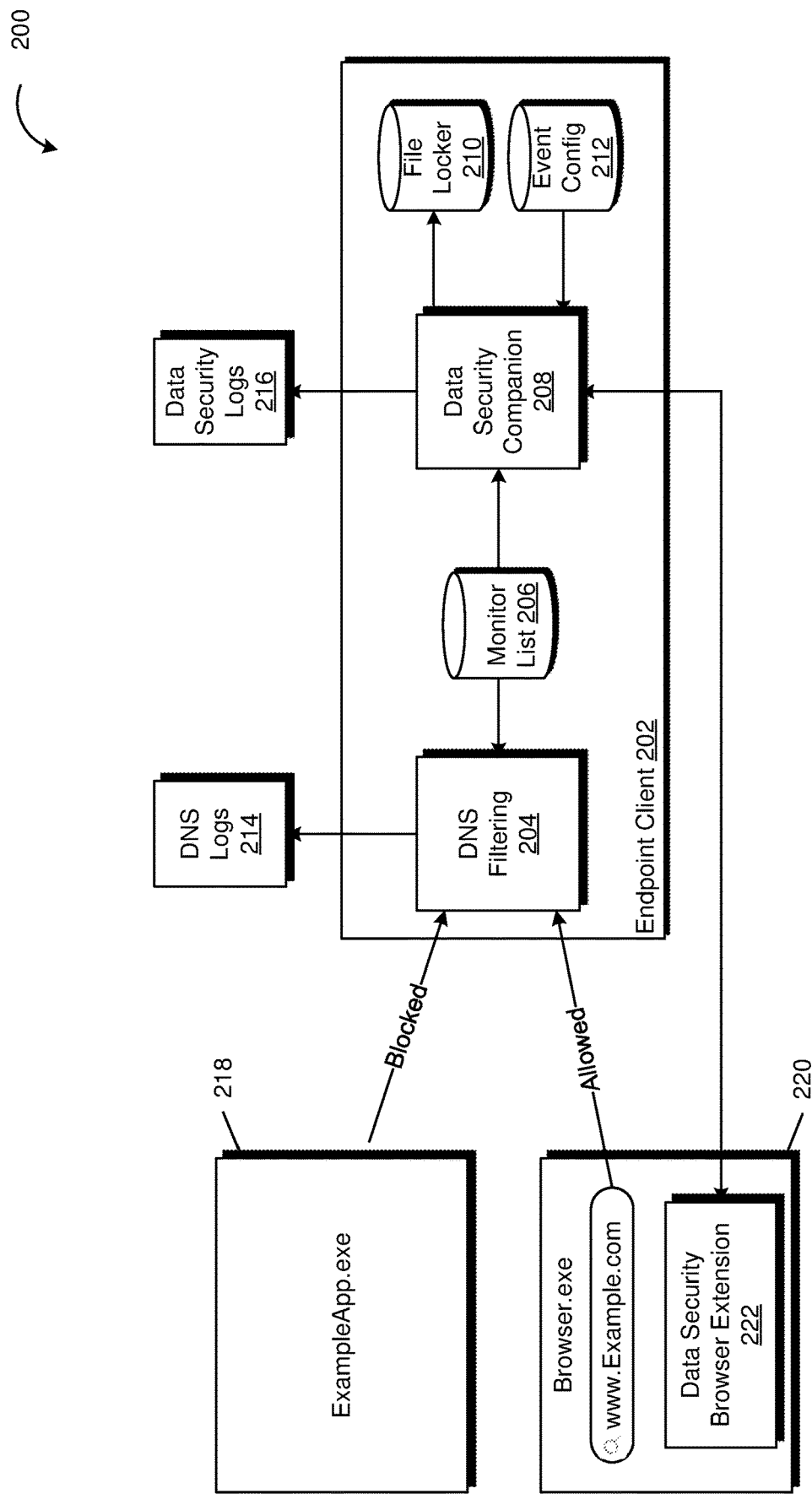
FIG. 2 illustrates a computing environment 200 in which an endpoint client that implements selective data monitoring techniques, in accordance with one or more example embodiments of the present disclosure.

FIG. 2 illustrates a computing environment 200 in which an endpoint client that implements selective data monitoring techniques, in accordance with one or more example embodiments of the present disclosure.

In various embodiments, computing environment 200 depicts various software and/or hardware that may be running on an endpoint. The endpoint may, for example, be a physical device such as a laptop issued to remote work employees, or may be a virtual device, such as a virtual machine instance that is instantiated on physical hardware.

In various embodiments, computing environment 200 comprises an endpoint client 202. Endpoint client 202 may be implemented running in a privileged mode of operation within the context of an operating system that is running on an endpoint device. For example, endpoint client 202 may be implemented at least in part as a kernel driver that is coupled to user mode components. As another example, endpoint client may be implemented as a system extension or system driver of an operating system. And there is a user mode component that talks to that system extension and it is a similar model where you have the system extension doing the low level "get me this packet" and communicates with the user mode component to do the filtering.

Generally speaking, the kernel mode component may comprise low level code that directly accesses network requests submitted by programs running on the operating system and provide the network request information to a user mode component that performs additional business logic of analyzing and determining how to process the network request. While keeping the kernel mode component as small as possible is generally desirable, it is not necessary to implement such a division between kernel mode and user mode operations, in at least some embodiments.

Endpoint client 202 comprises various components, such as DNS filtering 204, monitor list 206, data security companion 208, file locker 210, and event configuration 212. In various embodiments, functionality of the endpoint client—as described in greater detail below, may be performed at least in part in a privileged mode of operation, for example, kernel mode operation.

DNS filtering 204 may be used to populate DNS logs 214. Likewise, data security companion 208 may be utilized to populate data security logs 216. Further, the endpoint client 202 may interact with other applications running on an endpoint device, such as a first program 218 and second program 220. The first program 218 may be a non-approved application. The second program 220 may be an approved application that is more specifically, a web browser. The web browser may be provisioned with a data security browser extension 222.

DNS filtering 204 may refer to code running in the endpoint client 202 that implements DNS filtering. DNS filtering may refer to a technique for blocking certain websites. For example, DNS filtering is typically used to block access to websites that include harmful or inappropriate content, which may be defined or otherwise enumerated in a block list. DNS filtering 204 may access monitor list 206. In various embodiments, monitor list encodes or otherwise represents a list of destinations that can only be accessed through approved channels. If a request is made that matches the monitor list 206, it will be denied if it does not come from an approved application.

Monitor list 206 may be implemented as a data structure or data file that includes a list of domains, URLs, or hostnames that can only be used in limited circumstances. For example, access to destinations listed in the monitor list 206 may only be permissible from applications that are running a data security extension that provides for robust data monitoring. If a website is not included in the monitor list, data monitoring does not need to be performed. In many cases, this allows the endpoint device to drastically limit the amount of data monitoring that is performed on the device, which results in improved performance and/or battery life due to fewer data requests being analyzed, logged or otherwise processed. In various embodiments, DNS filter 204 is used to restrict access to certain URLs, domain names, or other destination to browser applications.

Data security companion 208 may refer to a binary or other executable code running in the context of endpoint client 202 that shares data and configurations with data security browser extension 222. Data security companion may be used to provide the data security browser extension with instructions to perform data monitoring of certain network traffic. For example, if a browser is used to navigate to a third-party file sharing site-here, represented as "www.Example.com" a representative placeholder of a website that may, for example, host file-sharing or data-sharing services-then data security browser extension 222 may be instructed to provide file transfer requests to the data security companion 208 for monitoring and/or logging.

Data security companion 208 may refer to executable code that communicates back and forth with data security browser extension 222 and indicates to the browser extension which domains should be monitored, how it should manage those connections, whether it should capture just metadata, capture full packets of every byte being sent to that domain, or whether it should let all traffic flow. For example, for non-monitored sites, the data security browser extension may collect no information regarding the user's activities on the site. However, if the user visits a monitored site, such as a file sharing website that has been previously linked to data leaks or exfiltrations, the extension will inject itself into the code of the website to capture data and/or metadata that is sent back/forth between the endpoint device and the site of interest.

Figure 4:
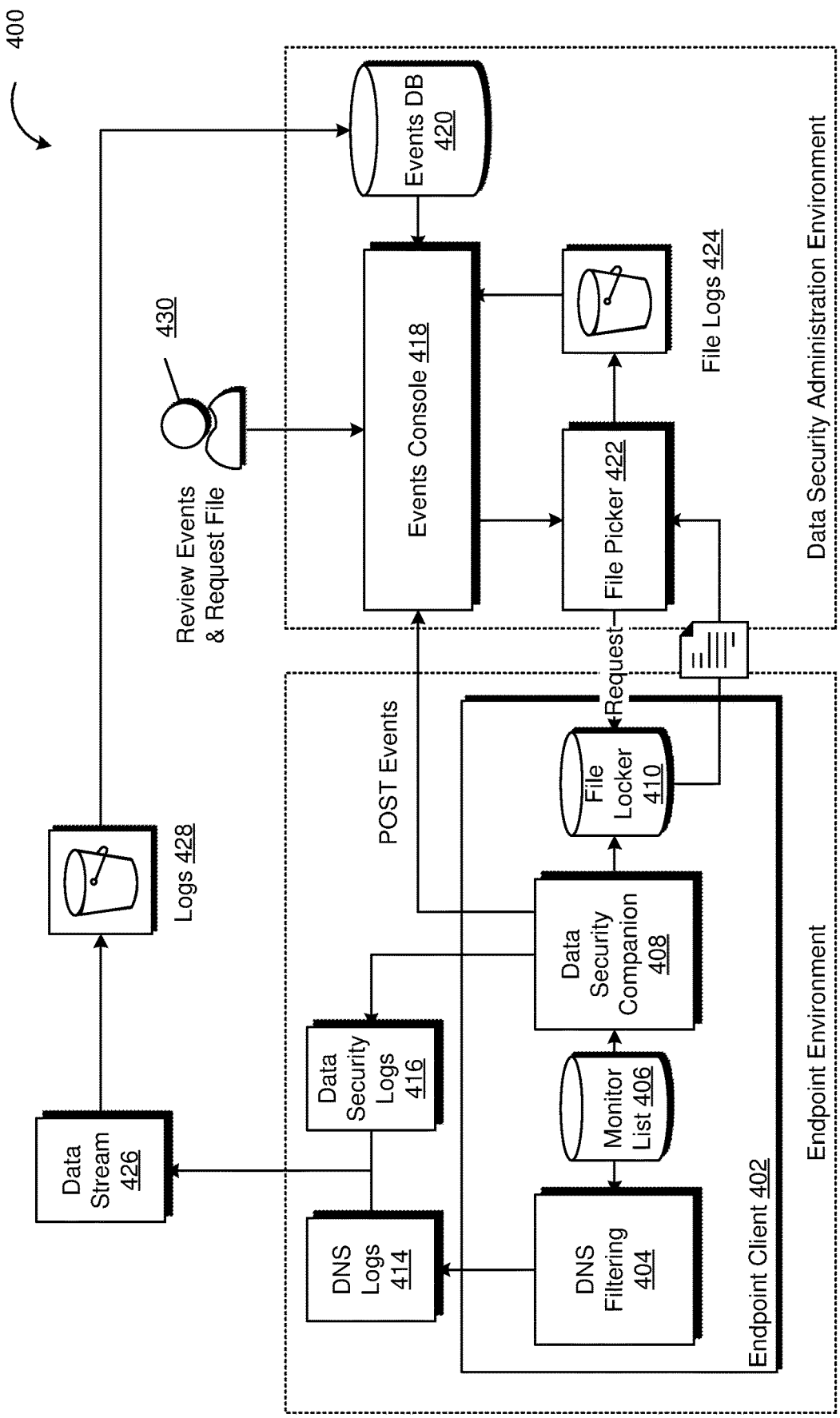
FIG. 4 illustrates a computing environment 400 comprising an endpoint environment and a data security administration environment, in accordance with one or more example embodiments of the present disclosure.

File locker 210 refers to a local data store or partition on an endpoint device. In various embodiments, when a data file is being uploaded or otherwise transmitted to a destination included in the monitor list, a copy of the data file may be stored locally within file locker 210. The file locker 210 may be inaccessible to the endpoint device's user or may be accessible only by privileged or administrative users, such as system administrators, super users, or auditors. In various embodiments, the file locker 210 is hidden from endpoint device users. Data stored in the file locker 210 may be encrypted and/or hashed so as to preserve the confidentiality and/or integrity of the underlying contents and/or to avoid further dissemination of such data in the event that the file locker 210 is unexpectedly accessed. In some embodiments, the contents of the file locker 210 may be automatically deleted after a period of time, such as 1 year, 2, years, or other periods of time. By keeping the data files local to the endpoint device, end-user privacy is preserved, as the contents are not automatically replicated to a cloud service. Rather, in various embodiments, data files in the file locker 210 are only uploaded to the cloud in response to a specific request—for example, FIG. 4 depicts a scenario in which an auditor identifies specific file(s) of interest and requests only that/those file(s) and requests only those files from an endpoint device's local file locker.

Event configuration 212, in various embodiments, refers to a database populated with configurations for data security. The event configurations 212 may refer to information that is used to determine how certain websites dissemble large files for transmission. For example, when large data files are uploaded, they are often not uploaded as a single, large, chunk of data. Rather, the data file is often split up into many small portions of the data file and uploaded—this way, the failure of any individual portion does not cause the entire upload to fail, and recovery can be performed by requesting the failed portion to be re-transmitted.

DNS logs 214 may be utilized to record requests that are received by DNS filtering 204. In various embodiments, DNS logs 214 are used to record all DNS requests that have been made, including which application made the request, where it was made, and whether it was allowed or rejected, and what the response was. DNS logs 214 may be stored locally on an endpoint device and provided to a data security administration environment (e.g., at a computing resource service provider), for example, as described in connection with FIG. 4.

While DNS logs 214 and data security logs 216 are depicted as being external to the endpoint client 202 in FIG. 2, in some embodiments some or all of these components may be implemented within endpoint client 202.

In various embodiments, first program 218 may be a non-approved application. Endpoint client 202 may determine whether an application is approved or not by inclusion or exclusion. For example, there may be an explicit allow list in endpoint client 202 that enumerates a specific set of approved applications and any applications not in this list are considered non-approved. When an application attempts to transmit data (e.g., a data file), the transmissions request may involve a DNS resolution that is processed by DNS filtering 204. DNS filtering may determine whether the destination for the transmission request is in the monitor list 206. If the destination is in the monitor list and first program 218 is a non-approved application, then the DNS resolution will fail and the data transmission will be effectively blocked. In various embodiments, the user of an endpoint device may receive an error when attempting to upload a file to remote data store via non-approved application, and may be prompted to use an approved application instead to perform the same task. As depicted in FIG. 2, Example-App.exe may be a program that is used to access a third-party file sharing service to upload files. The failed DNS resolution may be recorded in DNS logs 214 along with other information such as the process that attempted the call.

In contrast, consider a scenario in which second program 220 attempts to perform the same data file upload as described above. Second program 220 may refer to an approved application such as a web browser that has a data security browser extension 222 installed. The Data security companion 208 running in the endpoint client may be used to communicate with second program 220 via data security browser extension 222. In various embodiments, when second program 220 attempts to access the same third-party file sharing service (e.g., represented as www.Example.com), endpoint client 202 will detect the data transmission request, determine at DNS filtering 204 that the transmission request is for a destination in the monitor list, determine that the second program is an approved application, and furthermore determine via the data security companion 208 that a data security browser extension 222 is running on the approved application. Upon making these checks, the endpoint client may determine that the transmission of the file is permitted and fulfill the DNS resolution for the second program 220. The second program 220 may then upload the data file, and information regarding the upload, such as filename, file size, checksums, hashes, etc. may be monitored and recorded. The successful DNS resolution may be recorded in DNS logs 214 along with other information such as the process that attempted the call.

In various embodiments, when the data security browser extension 222 captures data, it will send metadata or full bytes to the data security companion 208 application that will post the event metadata to the organization's backend system, for example, as described in connection with FIG. 4. In some embodiments, the data and/or metadata is stored a local file locker or escrow location. For example, data security browser extension 222 may detect that a file "Confidential_Product_Launch_Info.PDF". Continuing with the example, since this website is being monitored, the uploaded PDF file would be copied and stored in file locker 210 and metadata such as the file name, file size, MinHashes of each paragraph of the PDF, the upload destination website, etc. may be uploaded to the organization. The copy of the PDF may be stored locally and uploaded later in response to an explicit request by an auditor to inspect the contents of the PDF to determine whether it does indeed contain confidential product launch information or if it the file contents do not match the file name description.

In this way, DNS filtering should be viewed as one way (but not necessarily the sole way) in which selective data monitoring may be accomplished. DNS filtering narrows the scope of what the endpoint client monitors rather than monitors all activity on a machine and all of its transactions happening on the machine. Furthermore, these techniques obviate the need to perform TLS cracking or other techniques that might otherwise be needed to inspect data being sent by third-party software and instead, the data security browser extension 222 can be utilized to efficiently monitor outgoing traffic before it is TLS encrypted. Furthermore, it should be appreciated that by defining a finite set of approved applications, only those applications need to perform data monitoring and other applications do not need to be monitored because DNS resolution will fail for those applications. This means that CLI tools, scripts, third-party file sharing executables, FTP transfer programs, and other tools for synchronizing files may be blocked from going to specific destinations in the monitor list. Furthermore, this architecture can be used to ensure that access to destinations in the monitor list are monitored by a data security extension that is able to robustly capture information regarding data files that are uploaded or otherwise provided to those sites. This may be used to monitor, detect, or even prevent the exfiltration of an organization's private data, whether it is done maliciously or inadvertently.

Furthermore, privacy of end users is also enhanced through selective data monitoring, as network traffic and data that is sent to other websites is not monitored and/or recorded. This allows for greater privacy assurances to users such as employees of the organization, who may have concerns over what information their employers are collecting regarding data that they transmit from endpoint device to other devices such as file sharing services.

Figure 3:
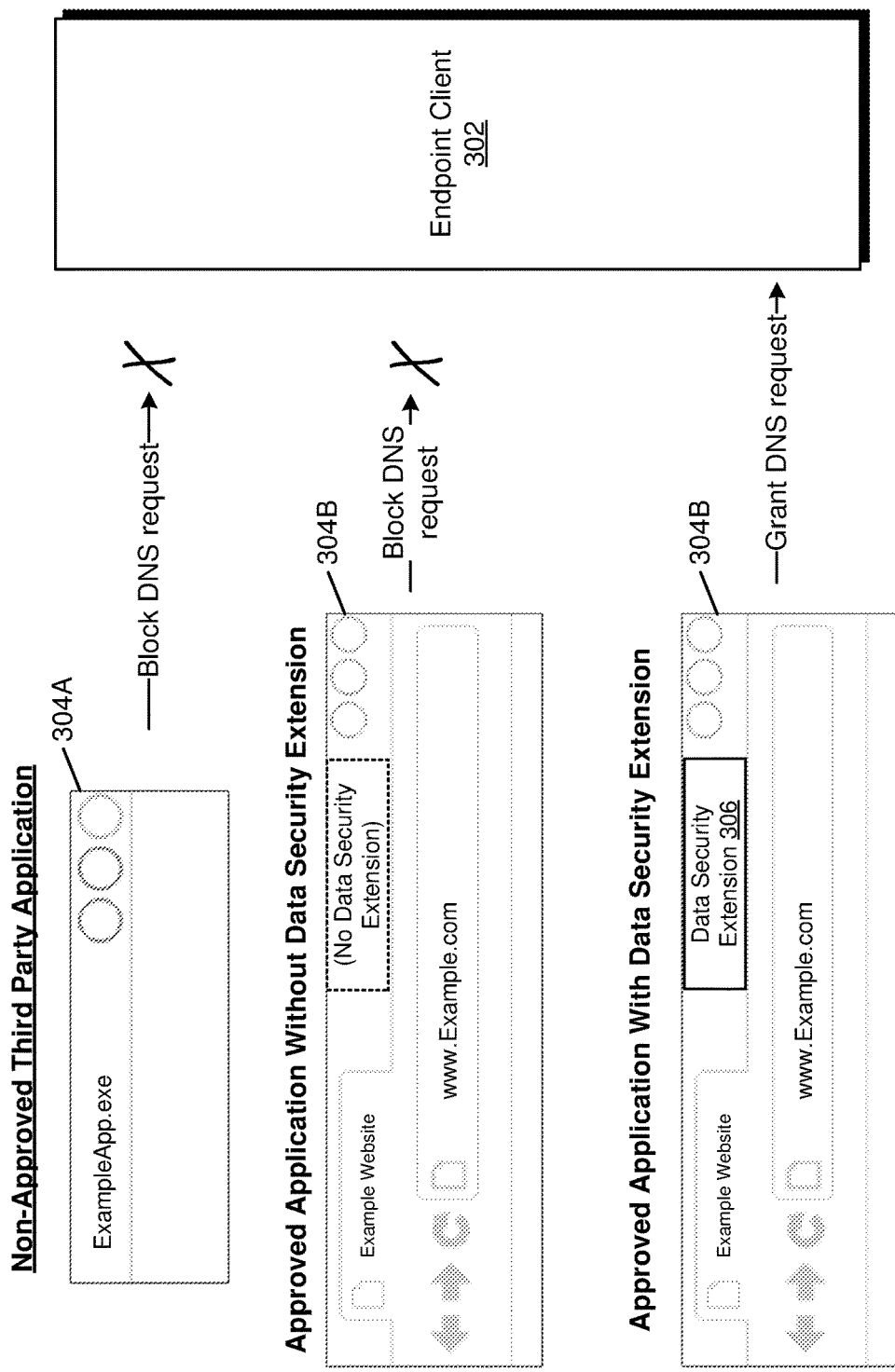
FIG. 3 illustrates a computing environment 300 in which an endpoint client that implements selective data monitoring techniques, in accordance with one or more example embodiments of the present disclosure.

FIG. 3 illustrates a computing environment 300 in which an endpoint client that implements selective data monitoring techniques, in accordance with one or more example embodiments of the present disclosure.

In various embodiments, computing environment 300 depicts various software and/or hardware that may be running on an endpoint. The endpoint may, for example, be a physical device such as a laptop issued to remote work employees, or may be a virtual device, such as a virtual machine instance that is instantiated on physical hardware. A corporation, government, or other entity that issues the endpoint device may configure the device with endpoint client 302. Endpoint client 302 may refer to security software, drivers, or other electronic components that may perform selective data monitoring as described throughout this disclosure. For example, endpoint client 302 may be implemented in accordance with techniques described elsewhere in this disclosure, such as those discussed in connection with FIG. 1, FIG. 2, FIG. 4, and FIG. 5.

Computing environment 300 depicts various software-based applications such as application 304A and application 304B. Application 304A may refer to a program that can typically be utilized to perform data upload but for endpoint client 302. Examples of applications may include executable programs that file sharing services (e.g., from first or third-party) that may be used to upload, synchronize, or otherwise distribute data, such as data files. For example, application 304A may have various graphical interfaces where a user may select or browse to a file and select it for upload to a file sharing service provider. While file sharing is described as one such example in which endpoint client 302 may be used to perform selective data monitoring, it should be appreciated that other types of data may be monitored, such as individual packets, text, instant messages, images, videos, binary data streams, and so on and so forth.

In various embodiments, application 304A is a program provided by a third-party file sharing service illustrated in FIG. 3 as "ExampleApp.exe" an executable program. In various embodiments, application 304A attempts to access the third-party file sharing service's domain—for example, to display files and drives that are network accessible and/or to provide an interface by which users can upload files. Application 304A may, in various embodiments, submit a DNS request to determine how to reach the destination. In various embodiments, endpoint client 302 may intercept the DNS request and determine the calling process. The calling process may be compared against a list of approved applications. In this case, the third-party file sharing program may be a non-approved application (e.g., it is not in the approved list or is explicitly included in a deny-list) and the DNS request is blocked, effectively preventing application 304A from being able to access a destination and thereby preventing application 304A from uploading data files to the destination. The user may be provided with a message that the request was blocked and that the user should use an approved program to access the third-party file sharing site, such as application 304B.

Endpoint client 302 may block the DNS request at the operation system (OS) level. From the DNS perspective, endpoint client 302 is limiting which applications on an endpoint can make those DNS requests.

Consider how, a second example DNS request that is made by second application 304B without data security extension, as depicted in the middle-portion of FIG. 3. Endpoint client 302 may determine that application 304B is a web browser and is on an approved list of applications. When DNS requests are made to through application 304B to most websites (e.g., those that are not on a deny-list or monitor-list), the DNS request will succeed. As depicted in the middle-portion of FIG. 2, application 304B may attempt to access the website for a third-party file sharing service similar to what was attempted by application 304A. In this example, endpoint client 302 will detect the DNS request and determine that application 304B is attempting to access a network destination that is being monitored. The endpoint client 302 will further check whether the data security browser extension is installed on application 304B. Again, returning to the middle-portion of FIG. 3, the data security extension is not installed. The user may be provided with a message that the request was blocked and that the user should install data security extension 306. This DNS request may be blocked by endpoint client 302.

Turning now to a third DNS request in the lower-portion of FIG. 3. In at least one embodiment of the present disclosure, data security extension 306 is installed on approved application 304B and the data security extension 306 will tell endpoint client 302 that it is running. Data security extension 306 may communicate with a data security companion running in the context of endpoint client 302. In at least one embodiment of the present disclosure, when the DNS request is made to access the third-party file sharing service's website "www.Example.com", the DNS request will go to endpoint client 302. Continuing with this example, endpoint client 302 will check that the request is coming from an approved web browser application and that the appropriate data security extension (e.g., in the form of a browser extension) is installed on the browser, and then allows the request to go through. The request may be logged to include the application making the DNS, the domain being requested, metadata regarding data transfers, and so on and so forth. Being able to associate the DNS request to a process and the ability to accept or deny it based on the presence of a data security browser extension are salient aspects of at least one embodiment depicted in FIG. 3.

In various embodiments, selective monitoring may be performed at the domain name level. For example, selective DNS filtering may be performed for all DNS requests to a domain such as www.Example.com as depicted in FIG. 3. In some embodiments, selective filtering may be performed only for some URLs. For example, in some embodiments, only certain URLs for a domain are subject to selective monitoring but not others. For example, in some embodiments, the monitor list includes a URL such as www.Example.com/upload. Continuing with this example, if a user visits another website under the same domain such as www.Example.com/about then filtering/monitoring is not performed as it is not in the monitor list. An organization's data security engineers may determine that uploads is only performed through certain URLs but not others, and may use this selective URL filtering to reduce the amount of filtering/monitoring that is performed on endpoint devices. In various embodiments, data security extension 306 is used to monitor specific URLs. For example, selective DNS filtering may allow for a domain in general to be accessed and the data security extension may be used to filter out specific URLs. As an example, the DNS filter may permit access to www.Example.com but the data security extension 306 prevents access to specific URLs within this domain, such as preventing access to www.Example.com/upload but otherwise allows access to other parts of the domain.

FIG. 4 illustrates a computing environment 400 comprising an endpoint environment and a data security administration environment, in accordance with one or more example embodiments of the present disclosure. Computing environment 400 may be used to implement selective data monitoring techniques described throughout this disclosure, for example, in accordance with disclosures described in connection with FIG. 2.

In various embodiments, computing environment 400 depicts software and/or hardware under an organization's control. Endpoint environment may refer to hardware and/or software associated with an endpoint, such as a laptop, mobile device, or other endpoint device. An endpoint device may run an endpoint client 402 comprising DNS filtering 404, monitor list 406, data security companion 408, and file locker 410. Endpoint client 402 may include additional components, less than all of the components shown in FIG. 4, or any suitable combination thereof. For example, endpoint client 402 may be implemented in accordance with techniques discussed in connection with FIG. 2 and may include, among other components, an event configuration component. As an illustrative, non-limiting example, data security companion 408 may receive metadata regarding file transfers for network destinations in monitor list 406 initiated from a web browser application running a data security browser extension. Endpoint environment may further comprise DNS logs 414 and/or data security logs 416. These components are, according to various embodiments, described in greater detail below.

In various embodiments, computing environment 400 depicts software and/or hardware under an organization's control. Data security administration environment may refer to hardware and/or software associated with data administrator for an organization, such as a service provider. Data security administration environment may comprise events console 418, events database 420, file picker 422, and file logs 424.

In various embodiments, DNS logs 414 record logs of all DNS requests made by the endpoint, regardless of whether the request is for a destination in the monitor list 406. Likewise, in various embodiments, data security logs 416 is used to record logs produced by a data security browser and includes metadata regarding transactions with third parties made by the browser. For example, the data security logs may include information regarding data file uploads. In various embodiments, DNS logs record all DNS requests that are made by an endpoint device, including who did it, where it was made, and whether it was allowed or rejected, and what the response was.

Data stream 426 may refer to a data stream that collects and aggregates logs from a plurality of endpoints. For example, an organization may have many endpoint devices and logs from those endpoints may be sent to data stream 426. Data stream 426 may be implemented as a fully managed, serverless streaming data service that provides elastic, scalable services for storing logs, events, clickstreams, and other forms of streaming data in real time. Logs 428 may refer to logs that are collected from all endpoints within an organization's network infrastructure and may be stored in one or more buckets.

In various embodiments, events console 418 refers to an interface that allows for authorized systems or users to interact with monitoring events and initiating file retrieval. For example, events console 418 may be utilized by a user 430 such as a system administrator, security engineer, or auditor to analyze events database 420. Events database 420 may store a list of all events in a database. File picker 422 may refer to a cloud-based workflow that connects to an endpoint device and copies one or more specified files out of the file locker of the endpoint device. The files may be uploaded to file logs 424, which may be implemented as a secure storage of files that have been uploaded from file lockers. In various embodiments, data stored in file logs 424 is encrypted at rest.

In various embodiments, a put event API call is made by the endpoint device to provide a new monitoring event to the data security administration environment. The events may be provided in real time. In various embodiments, a list event API call is made by authorized systems or user to list monitoring events. For example, a list events API may be used to list all events associated with an endpoint device during a specified time window. In various embodiments, the API may be used to list all instances of a MinHash associated with data associated with an exfiltration.

In various embodiments, data security logs 416 records hashes or fingerprints for a file. For example, a hash value may be generated for each paragraph of a text-based file. The hash may be generated according to a SHA-based hash algorithm. In various embodiments, when a data leak occurs, the contents of the data leak may be publicly known. This leaked data may be processed to produce one or more hashes that can be used to "fingerprint" or identify the leaked data. User 430 may use events console 418 to search for any instances of the leaked data, such as hashes that match the leaked data. Assuming, for example, that a matching hash is found in events database 420. The events database 420 may specify the particular endpoint device associated with the event. User 430 may use file picker 422 to request the file with the hash from the endpoint device's file locker. The file may be copied from file locker 410 of the local endpoint device to the file logs 424 of the cloud service and then accessed by user 430 via events console 418. The user 430 may then inspect the file and determine whether the file is relevant to the data leak. The use of file picket 422 to request files from endpoint devices may be contingent upon approval of a review process by auditors or other designated entities.

In various embodiments, selective data monitoring may have user-specific policies. For example, if a first local user of a first endpoint device is in a specific group or specific role, that user may be allowed to access certain network destinations or domains that would otherwise be blocked.

In various embodiments, endpoint client 402 may be used to perform sampled and anonymized capturing of generic browsing. For example, DNS logs can be used to track uploads to a previously untracked website. Patterns may be detected from the DNS logs, such as the presence of consistent data uploads. This may be used as an indication for the endpoint device to capture information and metadata about uploads to that website and to learn more about where the data is going. This can be used to determine when new network destinations should be added to the monitor list.

Figure 5:
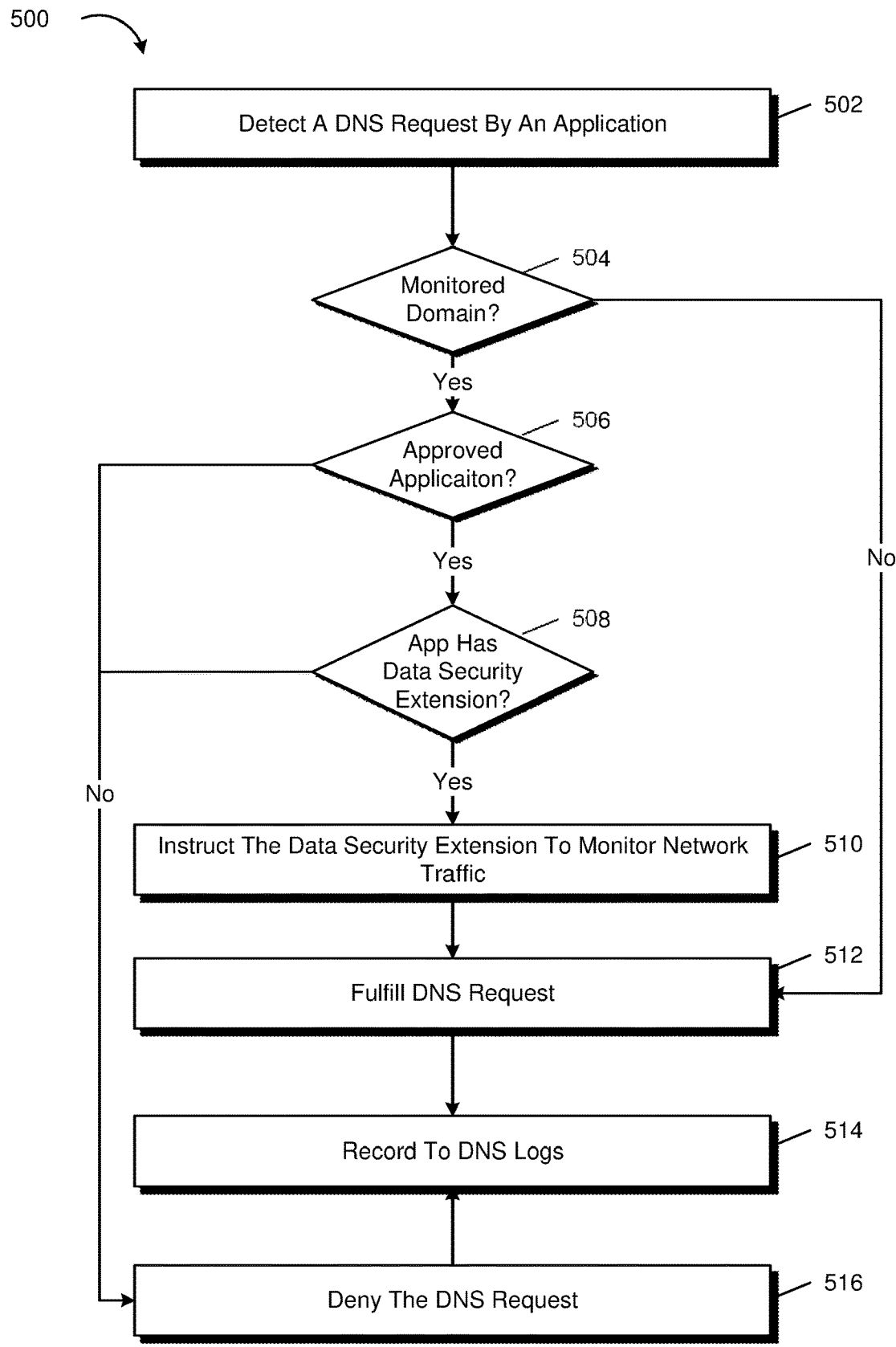
FIG. 5 shows an illustrative example of a process 500 for selective endpoint monitoring, in accordance with one or more example embodiments of the present disclosure.

FIG. 5 shows an illustrative example of a process 500 for selective endpoint monitoring, in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. In at least one embodiment, a system, comprises one or more processors and memory storing executable instructions that, as a result of execution by the one or more processors, cause the system to perform one or more of the steps of process 500. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 1-5 and 7. In at least one embodiment, process 500 or a portion thereof is implemented by an endpoint device as described throughout this disclosure.

In at least one embodiment, process 500 comprises a step 502 to detect a DNS request by an application. The DNS request may be routed to an endpoint client running in a privileged mode of operation, such as a kernel mode component of the system.

In at least one embodiment, process 500 comprises a step 504 to determine whether the request is for a domain that is being monitored. An endpoint client may receive the DNS request and determine whether it is being monitored by referring to a monitor list, for example, as described in connection with FIG. 2. If the DNS request is for a domain or network destination that being monitored, then process 500 may proceed to step 506. If not, then the system may proceed to step 512 and fulfill the DNS request, thereby providing the application with information usable to access the network destination. It should be noted that other information, such as block lists, are not considered in this example and other mechanisms may be implemented to prevent access to the network destination. The system may furthermore perform step 514 and record to DNS logs that the DNS request was fulfilled. In various embodiments, metadata associated with the DNS request, such as an application identifier, may be included in the DNS logs.

In at least one embodiment, process 500 comprises a step 506 to determine whether the application is an approved application. An endpoint client may include a list of approved applications that are required for accessing specific network destinations that are on a monitor list. If the application making the DNS request is not an approved application, then process 500 may proceed to step 516 and deny the DNS request. This will effectively deny the application access to information usable to access the requested network destination. The system may furthermore perform step 514 and record to DNS logs that the DNS request was denied. In various embodiments, metadata associated with the DNS request, such as an application identifier, may be included in the DNS logs. However, if the application is approved, then process 500 may proceed to step 508.

In at least one embodiment, process 500 comprises a step 508 to determine whether the application has been provisioned with a data security extension. For example, if the approved application is a web browser, the data security extension may be implemented as a data security browser extension. Even if an application is an approved application, the DNS request may still be denied if the application is not running the data security extension. In such cases, process 500 may proceed to step 516 and deny the DNS request. This will effectively deny the application access to information usable to access the requested network destination. The system may furthermore perform step 514 and record to DNS logs that the DNS request was denied. However, if the application is approved, then process 500 may proceed to step 510.

In at least one embodiment, process 500 comprises a step 510 to instruct the data security extension of the application to selectively monitor network traffic with the network destination. Accordingly, by using such techniques, only a subset of network traffic may be monitored and data security logs may be generated only for the sites included in the endpoint client's monitor list. This improves the privacy of the data monitoring system and reduces the amount of data collected by the endpoint and focuses data monitoring efforts on network destinations that are most likely to be involved in security events. In various embodiments, a network destination can be expressed as a URL, a domain name, a hostname, network address such as IPv4 or IPv6 network address, or combinations thereof.

In at least one embodiment, process 500 comprises a step 512 and fulfill the DNS request, thereby providing the application with information usable to access the network destination. It should be noted that other information, such as block lists, are not considered in this example and other mechanisms may be implemented to prevent access to the network destination. The system may furthermore perform step 514 and record to DNS logs that the DNS request was fulfilled. In various embodiments, metadata associated with the DNS request, such as an application identifier, may be included in the DNS logs.

In at least one embodiment, a computer-implemented method for selective data monitoring comprises: determining, at an endpoint client running in a privileged mode of operation, a first domain name system (DNS) request by a first application to access a first website; determining, at the endpoint client, that the first website is included in a monitor list; determining, at the endpoint client, that the first application is included in a list of approved applications; determining, at the endpoint client, that the first application is running a data security extension; responsive to the determinations that (i) the first website is included in the monitor list, (ii) the first application is included in the list of approved applications, and (iii) the first application is running the data security extension, fulfilling the first DNS request; determining, using the data security extension of the first application, a file is being uploaded to the first website; determining, using the data security extension, metadata associated with the file; providing the metadata from the data security extension to a data security companion of the endpoint client; and creating a copy of the file in the file locker of the endpoint client.

In various embodiments, the method further comprises recording, in a DNS log, information regarding the first DNS request, the information including: first data indicating that the first application made the first DNS request; second data indicating that the first website was being requested in the first DNS request; and third data indicating whether the first DNS request was approved or rejected by the endpoint client.

In various embodiments, the method further comprises determining, at the endpoint client, a second domain name system (DNS) request by a second application to access the first website; determining, at the endpoint client, that second application is not included in the list of approved applications; and responsive to the determination that the second application is not included in the list of approved applications, blocking the second DNS request.

In various embodiments, the method further comprises determining, at the endpoint client, a third domain name system (DNS) request by the second application to access the second website; determining, at the endpoint client, that the second website is included in the monitor list; and responsive to the determination that the second website is not included in the monitor list, fulfilling the third DNS request.

In various embodiments, the method further comprises determining metadata associated with the file; and transmitting the metadata to a data security administration environment.

In various embodiments, the method further comprises obtaining, at the endpoint client, a file transfer request from the data security administration environment associated with the metadata; and responsive to the file transfer request, uploading the copy of the file to the data security administration environment.

In various embodiments, a system comprises one or more processors; and memory storing executable instructions that, as a result of execution by the one or more processors, cause the system to: determine, at an endpoint client running in a privileged mode of operation, a first request by a first application to access a first network destination; determine, at the endpoint client, that network traffic to the first network destination should be monitored; determine, at the endpoint client, that a data security extension has been provisioned on the first application; provide, to the first application, information usable to access the first network destination; and obtain, from the data security extension, metadata associated with data that the first application provides to the first network destination.

In various embodiments, the application is a web browser and/or the data security extension is implemented as a browser extension.

In various embodiments, the data provided to the first application comprises a file; and the executable instructions include further instructions that, as a result of execution by the one or more processors, further cause the system to make a copy of the file.

In various embodiments, the executable instructions include further instructions that, as a result of execution by the one or more processors, further cause the system to: obtain, at the endpoint client, a transfer request from a data security administration environment for the file; and responsive to the file transfer request, upload the copy of the file to the data security administration environment.

In various embodiments, the executable instructions include further instructions that, as a result of execution by the one or more processors, further cause the system to: determine, at the endpoint client, a second request by a second application to access the first network destination; determine, at the endpoint client, that second application lacks the data security extension; and deny the second application access to the information usable to access the first network destination.

In various embodiments, the executable instructions include further instructions that, as a result of execution by the one or more processors, further cause the system to: determine, at the first application, a file is being uploaded to the first network destination; determine a plurality of portions of the file; determine respective hashes for each of the plurality of portions of the file; and provide, by the data security extension, the respective hashes to the endpoint client.

In various embodiments, the metadata comprises a file name of the file; a file size of the file; a checksum of the file; the respective hashes of the file; or any suitable combination thereof.

In various embodiments, the executable instructions include further instructions that, as a result of execution by the one or more processors, further cause the system to: determine, at the endpoint, a plurality of transactions transmitted to the first website; obtain event configuration associated with the first website; and re-assemble, from the plurality of transactions and based at least in part on the event configuration, a file transmitted to the first website.

Figure 6:
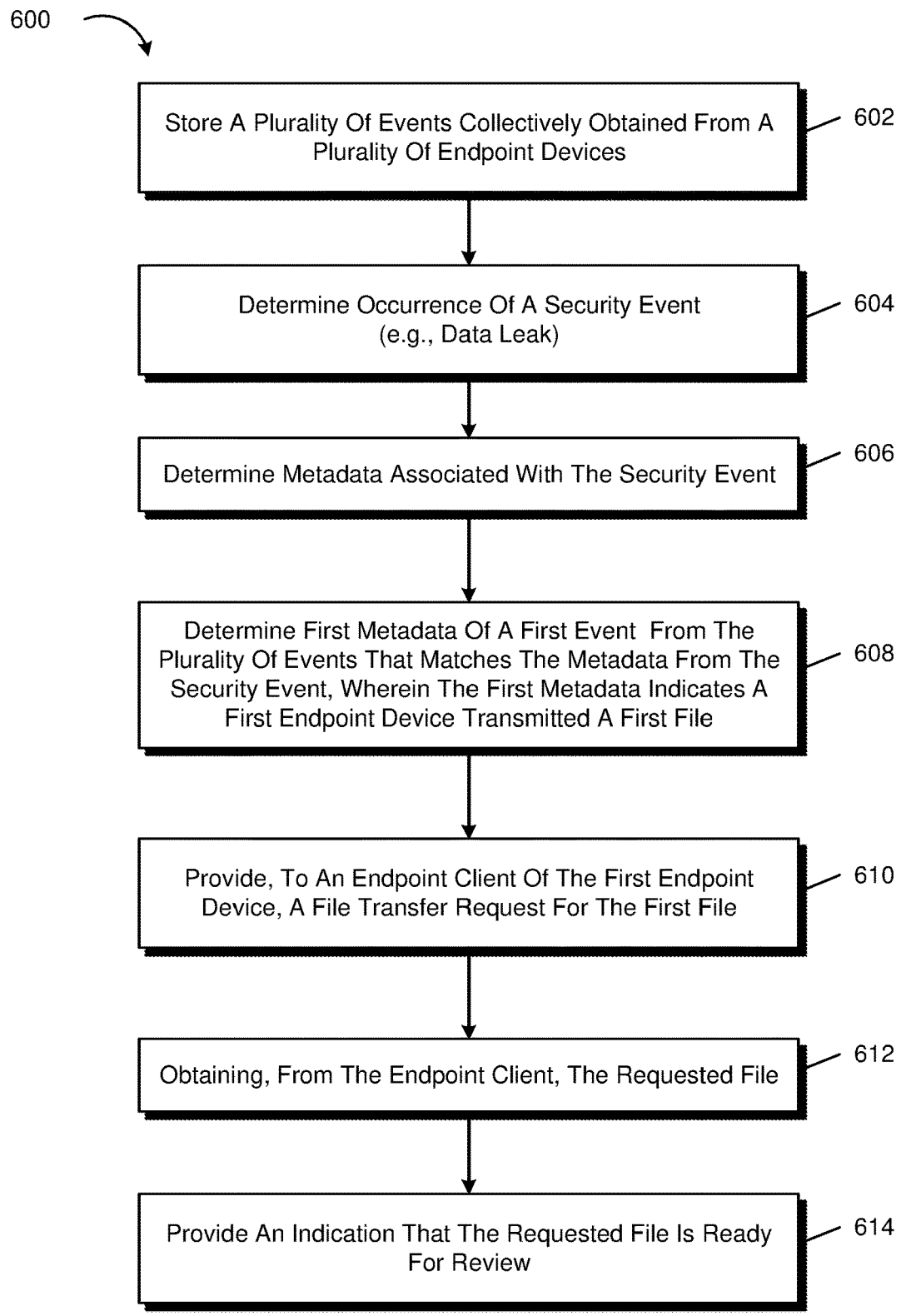
FIG. 6 shows an illustrative example of a process 600 for data security investigations, in accordance with one or more example embodiments of the present disclosure.

FIG. 6 shows an illustrative example of a process 600 for data security investigations, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. In at least one embodiment, a system, comprises one or more processors and memory storing executable instructions that, as a result of execution by the one or more processors, cause the system to perform one or more of the steps of process 600. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 4 and 7. In at least one embodiment, process 600 or a portion thereof is implemented in the context of a data security administration environment as described throughout this disclosure. In at least one embodiment, techniques described in connection with FIG. 6 may be used to investigate security events, such as suspected data leaks, exfiltrations, hacks, or other forms of data loss.

In at least one embodiment, process 600 comprises a step 602 to store a plurality of events collectively obtained from a plurality of endpoint devices. Events may be collected from a data stream that receives DNS logs and/or data security logs from a plurality of endpoint devices, for example, as described in connection with FIG. 4.

In at least one embodiment, process 600 comprises a step 604 to determine occurrence of a security event. The security event may be a suspected data leaks, exfiltrations, hacks, or other forms of data loss. The security event may refer to a periodic review that is not involved with data loss, but rather, may be undertaken as a prophylactic measure or as part of a data governance or data protection strategy.

In at least one embodiment, process 600 comprises a step 606 to determine metadata associated with the security event. In various embodiments, if sensitive data is determined to have been leaked—for example, being found to be publicly available when such data should have remained private to an organization, the leaked data or a portion thereof (e.g., a specific paragraph or unique portion of the data) may be hashed to generate a "fingerprint" of the data.

In at least one embodiment, process 600 comprises a step 608 to determine first metadata of a first event from the plurality of events that matches the metadata from the security event, wherein the first metadata indicates a first endpoint device transmitted a first file. In various embodiments, endpoint devices generate metadata when the endpoint device transmits data to certain monitored websites. In this case, the first metadata may indicate that a particular endpoint device uploaded a file to a monitored network destination.

In at least one embodiment, process 600 comprises a step 610 to provide, to an endpoint client of the first endpoint device, a file transfer request for the first file. In various embodiments, the endpoint device will save a copy of files that are uploaded to monitored network destinations. These files are not, however, automatically uploaded to the data security administration environment in various embodiments, but may be made available to the data security administration environment upon a manual request that is made by an auditor or security engineer, for example, via a file picker as described in connection with FIG. 4

In at least one embodiment, process 600 comprises a step 612 to obtain, from the endpoint client of the first endpoint device, the requested file. The requested file may be saved in an encrypted format to ensure the security of the file as it is being investigated.

In at least one embodiment, process 600 comprises a step 614 to provide an indication that the requested file is ready for review. The indication may include the metadata associated with the security event or other information indicating why the file was uploaded and how it may be potentially related to the aforementioned security event.

In various embodiments, a computer-implemented method comprises: obtaining a plurality of events from a plurality of endpoint devices, wherein a first event of the plurality of events comprises first metadata associated with a first file transmitted by a first endpoint device to a first network destination that is included in a list of monitored network destinations; determining second metadata associated with a security event; determining that the first metadata matches the second metadata; providing, to an endpoint client of the first endpoint device, a file transfer request for the first file; and obtaining, from the endpoint client of the first device, the first file.

In various embodiments, the first metadata comprises a plurality of hashes that are each generated based at least in part on respective portions of the first file.

In various embodiments, the security event involves unauthorized distribution of sensitive data; determining the second metadata comprises generating a hash of at least a portion of the sensitive data; and determining that the first metadata matches the second metadata comprises searching a database storing the plurality of events for metadata that matches the hash.

In various embodiments, the method further comprises: obtaining domain name system (DNS) request information from the plurality of endpoint devices; determining a data upload pattern to a second network destination; and causing the plurality of endpoint devices to monitor network traffic to the second network destination.

In various embodiments, the list of monitored network destinations comprises domain names and uniform resource locators (URLs). For example, in some cases, an entire website may be monitored, whereas in other cases, specific links may be monitored for a more tailored, less intrusive data monitoring approach.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 7:
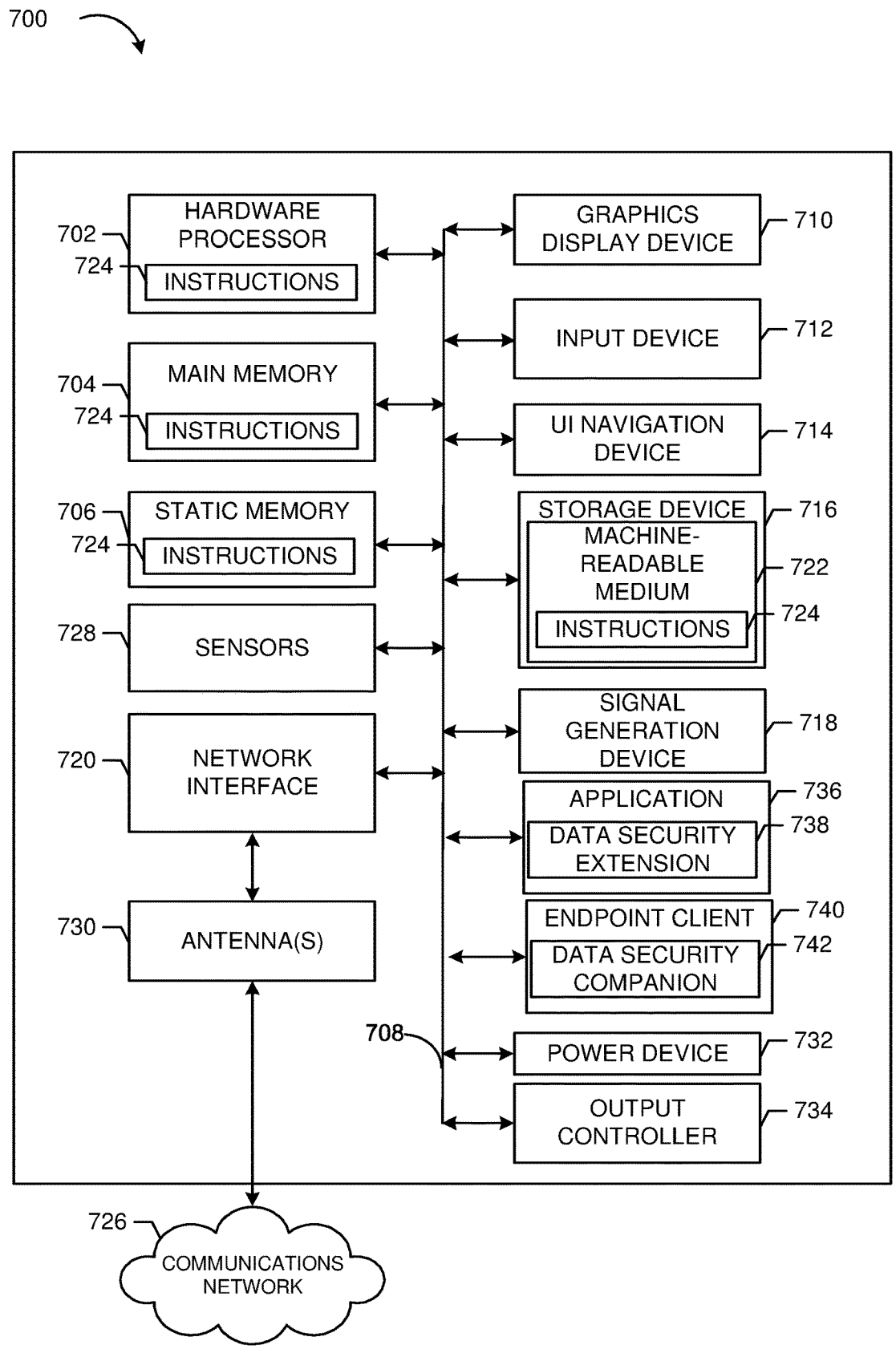
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., implemented in whole or in part in the context of embodiments described in connection with other figures. In some embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include any combination of the illustrated components. For example, the machine 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (e.g., drive unit) 716, a signal generation device 718, and a network interface device/transceiver 720 coupled to antenna(s) 730. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

In various embodiments, application 736 refers to an approved application, for example, as described in connection with FIG. 1, FIG. 2, FIG. 3, FIG. 4, FIG. 5, and elsewhere in this disclosure. Application 736 may comprise data security extension 738. For example, if application 736 is a web browser, data security extension 738 may be implemented as a browser extension. Techniques described in connection with FIGS. 1-6 may be implemented using machine 700.

In various embodiments, endpoint client 740 refers to an endpoint client, for example, as described in connection with FIG. 1, FIG. 2, FIG. 3, FIG. 4, FIG. 5, and elsewhere in this disclosure. Endpoint client 740 may execute in a privileged mode of operation, for example, as a kernel or system level component. Endpoint client 740 may comprise a data security companion 742 that is in communication with data security extension 738 to perform selective data monitoring.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may be omitted from various discussions for the sake of clarity.

What is claimed is:

1. A computer-implemented method, comprising:
    determining, at an endpoint client running in a privileged mode of operation, a first domain name system (DNS) request by a first application to access a first website;
    determining, at the endpoint client, that the first website is included in a monitor list;
    determining, at the endpoint client, that the first application is included in a list of approved applications;
    determining, at the endpoint client, that the first application is running a data security extension, wherein the data security extension is configured to collect metadata;
    responsive to the determinations that (1) the first website is included in the monitor list, (11) the first application is included in the list of approved applications, and (111) the first application is running the data security extension, fulfilling the first DNS request;
    determining, using the data security extension of the first application, a file is being uploaded to the first website;
    determining, using the data security extension, the metadata collected by the data security extension and associated with the file, wherein the metadata comprises a hash of at least a portion of the file;
    providing the metadata from the data security extension to a data security companion of the endpoint client;

creating a copy of the file accessible to the endpoint client;
transmitting the metadata to a data security administration environment;
obtaining, at the endpoint client, a file transfer request from the data security administration environment associated with the metadata; and
responsive to the file transfer request, uploading the copy of the file to the data security administration environment.

2. The computer-implemented method of claim 1, further comprising:
determining, at the endpoint client, a second domain name system (DNS) request by a second application to access the first website;
determining, at the endpoint client, that second application is not included in the list of approved applications; and
responsive to the determination that the second application is not included in the list of approved applications, blocking the second DNS request.

3. The computer-implemented method of claim 2, further comprising:
determining, at the endpoint client, a third domain name system (DNS) request by the second application to access a second website;
determining, at the endpoint client, that the second website is included in the monitor list; and
responsive to the determination that the second website is not included in the monitor list, fulfilling the third DNS request.

4. The computer-implemented method of claim 1, further comprising recording, in a DNS log, information regarding the first DNS request, the information including:
first data indicating that the first application made the first DNS request;
second data indicating that the first website was being requested in the first DNS request; and
third data indicating whether the first DNS request was approved or rejected by the endpoint client.

5. A system, comprising:
one or more processors; and
memory storing executable instructions that, as a result of execution by the one or more processors, cause the system to:
determine, at an endpoint client running in a privileged mode of operation, a first request by a first application to access a first network destination;
determine, at the endpoint client, that network traffic to the first network destination should be monitored;
determine, at the endpoint client, that a data security extension has been provisioned on the first application, wherein the data security extension is configured to collect metadata associated with the request;
provide, to the first application, information usable to access the first network destination;
obtain, from the data security extension, the metadata collected by the data security extension and associated with data that the first application provides to the first network destination, wherein the metadata comprises a hash of at least one file sent by the first application to the first network destination:
create a copy of the file;
obtain, at the endpoint client, a file transfer request from a data security administration environment for the file; and
responsive to the file transfer request, upload the copy of the file to the data security administration environment.

6. The system of claim 5, wherein the executable instructions include further instructions that, as a result of execution by the one or more processors, further cause the system to:
determine, at the first application, a file is being uploaded to the first network destination;
determine a plurality of portions of the file;
determine respective hashes for each of the plurality of portions of the file; and
provide, by the data security extension, the respective hashes to the endpoint client.

7. The system of claim 6, wherein the metadata comprises one or more of a set comprising:
a file name of the file;
a file size of the file;
a checksum of the file; and
the respective hashes of the file.

8. The system of claim 5, wherein the first application is a web browser.

9. The system of claim 8, wherein the data security extension is a browser extension.

10. The system of claim 5, wherein the executable instructions include further instructions that, as a result of execution by the one or more processors, further cause the system to:
determine, at the endpoint client, a second request by a second application to access the first network destination;
determine, at the endpoint client, that second application lacks the data security extension; and
deny the second application access to the information usable to access the first network destination.

11. The system of claim 5, wherein the executable instructions include further instructions that, as a result of execution by the one or more processors, further cause the system to:
determine, at the endpoint, a plurality of transactions transmitted to the first network destination;
obtain event configuration associated with the first network destination; and
re-assemble, from the plurality of transactions and based at least in part on the event configuration, a file transmitted to the first network destination.

12. A computer-implemented method, comprising:
obtaining, by a data security administration environment, a plurality of events from a plurality of endpoint devices, wherein a first event of the plurality of events comprises first metadata associated with a first file transmitted by a first endpoint device to a first network destination that is included in a list of monitored network destinations,
wherein the first metadata is collected by a security extension at the first endpoint device,
wherein the metadata comprises a hash of at least a portion of the first file;
determining, by the data security administration environment, second metadata associated with a security event,
wherein the second metadata is collected by the security extension at the first endpoint device,
wherein the security event involves unauthorized distribution of sensitive data;
determining that the first metadata matches the second metadata by searching the database storing the plurality of events for metadata that matches the hash;
providing, by the data security administration environment, to an endpoint client of the first endpoint device, a file transfer request for the first file; and obtaining, by the data security administration environment, from the endpoint client of the first device, the first file.

13. The computer-implemented method of claim 12, wherein the first metadata comprises a plurality of hashes that are each generated based at least in part on respective portions of the first file.

14. The computer-implemented method of claim 12, further comprising:
   obtaining domain name system (DNS) request information from the plurality of endpoint devices;
   determining a data upload pattern to a second network destination; and
   causing the plurality of endpoint devices to monitor network traffic to the second network destination.

15. The computer-implemented method of claim 12, wherein the list of monitored network destinations comprises domain names.

\* \* \* \* \*

UNITED STATES PATENT AND TRADEMARK OFFICE
CERTIFICATE OF CORRECTION

| | | |
|---|---|---|
| PATENT NO. | : 12,462,053 B1 | Page 1 of 1 |
| APPLICATION NO. | : 18/065377 | |
| DATED | : November 4, 2025 | |
| INVENTOR(S) | : Dexter W. Markley et al. | |

It is certified that error appears in the above-identified patent and that said Letters Patent is hereby corrected as shown below:

In the Claims

Claim 1 at Column 28, Lines 55-58 should read:
-- responsive to the determinations that (i) the first website is included in the monitor list, (ii) the first application is included in the list of approved applications, and (iii) the first application is running the data security --.

Signed and Sealed this
Sixteenth Day of December, 2025

John A. Squires
*Director of the United States Patent and Trademark Office*